US007717305B2

(12) United States Patent
Liang

(10) Patent No.: US 7,717,305 B2
(45) Date of Patent: May 18, 2010

(54) EXTRUSION APPARATUS FOR HIGH VISCOSITY LIQUID

(76) Inventor: Haijun Liang, No. 35 XiaLiang South Street, JinQing Town, LuQiao District, TaiZhou City, ZheJiang Province (CN)

( * ) Notice: Subject to any disclaimer, the term of this patent is extended or adjusted under 35 U.S.C. 154(b) by 499 days.

(21) Appl. No.: 11/699,415

(22) Filed: Jan. 30, 2007

(65) Prior Publication Data

US 2008/0023494 A1 Jan. 31, 2008

(30) Foreign Application Priority Data

Jul. 31, 2006 (CN) .................... 2006 2 0106247 U

(51) Int. Cl.
*G01F 11/00* (2006.01)

(52) U.S. Cl. ...................................................... 222/391

(58) Field of Classification Search ................. 222/391; 74/141.5, 169
See application file for complete search history.

(56) References Cited

U.S. PATENT DOCUMENTS 1,013,454 A * 1/1912 Sherbondy .................. 222/391
2,125,259 A * 7/1938 Bagley ....................... 222/391
2,180,978 A * 11/1939 Crewe ......................... 74/169
7,258,324 B2 * 8/2007 Gilman ....................... 254/222

FOREIGN PATENT DOCUMENTS

DE 3904956 A1 * 8/1990

OTHER PUBLICATIONS

Automated English language translation of DE 3904956 A1 from European Patent Office Web site.*

* cited by examiner

*Primary Examiner*—Kenneth Bomberg
(74) *Attorney, Agent, or Firm*—Cheng Law Group, PLLC

(57) ABSTRACT

The present invention discloses an extrusion apparatus for high viscosity liquid to address the problems that the existing extrusion apparatus tends to be abraded for long-time use and the high viscosity liquid could not be well extruded. The extrusion apparatus for high viscosity liquid of the invention comprises a gun body, a retainer fixedly connected to the gun body, a push rod slidably running through the gun body, a wrench hinged to the gun body and a handle connected to the gun body, characterized in that, a push block is hinged to one end of the wrench adjacent to the push rod, the push rod has a rod body provided with several teeth on the side facing the push block, a push tooth is provided on the push block, a permanent magnet is placed on the push block or the push rod, and the push tooth could be snapped to the teeth under action of the magnetic force of the permanent magnet.

7 Claims, 5 Drawing Sheets

EXTRUSION APPARATUS FOR HIGH VISCOSITY LIQUID

BACKGROUND OF THE INVENTION

1. Field of Invention

The present invention relates to an apparatus for extruding liquid, and more particularly, to an extrusion apparatus for high viscosity liquid.

2. Related Art

An extrusion apparatus is required to coat the existing high viscosity liquid, such as glass pastes. The conventional extrusion apparatus comprises a gun body, a retainer set at front end of the gun body, a push rod running through the gun body and a wrench hinged to the gun body. The push rod is shaped as a prism, and could slide within the gun body. A push plate is hinged to the upper end of the wrench, on which a through hole is arranged with a shape similar to the cross section of the push rod. The size of the through hole is slightly larger than that of the cross section of the push rod. An anti-back plate with the same shape as the push plate is further provided after the gun body. The push rod is passed through the anti-back plate. During operation, a cylinder storing high viscosity liquid is fixed on the retainer, the wrench is turned to drive the push plate, the push rod is pressed against a piston in the cylinder, and the piston is further pushed to extrude the liquid out of the cylinder, so that the high viscosity liquid is coated. During operation of the extrusion apparatus, the liquid is extruded by turning the wrench, but the amount of the liquid extruded out of the cylinder is difficult to control, and the uniformity of coating of the liquid is impaired and the coating quality can not be guaranteed. Moreover, if the extrusion apparatus has been operated for a long time, abrasion tends to occur between the push plate and the push rod, and the use effect is further impaired. Furthermore, the anti-back plate is used to prevent the push rod moving reversely in real time. The outlet of the cylinder is generally not too large. After the wrench is turned once, the liquid in the cylinder can not flow out of the outlet in time, and the piston in the cylinder applies a reverse acting force to the push rod. The push rod can not be moved reversely under action of the anti-back plate. This way, there is still liquid flowing out of the outlet after a period of coating, which causes a lot of waste. A large amount of high viscosity liquid is adhered around the outlet, causing the outlet unclean. Once the high viscosity liquid is solidified, the liquid can not conveniently flow out of the cylinder through the outlet.

SUMMARY OF THE INVENTION

In order to overcome the drawbacks that it is difficult to control the exportation amount by using the conventional extrusion apparatus for high viscosity liquid and the coating quality is impaired, one object of the present invention is to provide a novel extrusion apparatus for high viscosity liquid, in which the exportation amount could be efficiently controlled, the high viscosity liquid could be more uniformly coated, the related parts of the apparatus will hardly be abraded, so that the stability of the extrusion apparatus could be largely improved.

Another object of the invention is to provide an extrusion apparatus for high viscosity liquid to reduce waste of the liquid during coating.

The extrusion apparatus for high viscosity liquid of the invention comprises a gun body, a retainer fixedly connected to the gun body, a push rod slidably running through the gun body, a wrench hinged to the gun body and a handle connected to the gun body, characterized in that, a push block is hinged to one end of the wrench adjacent to the push rod, the push rod has a rod body provided with several teeth on the side facing the push block, a push tooth is provided on the push block, a permanent magnet is placed on the push block or the push rod, and the push tooth could be snapped to the teeth under action of the magnetic force of the permanent magnet.

After the wrench is turned backwards during operation, the push block rotates about the hinge point under action of the magnetic force of the permanent magnet, the free end of the push block is moved to the rod body, the push tooth on the push block is snapped between the teeth set on rod body, and the rod body is driven to move forward, so that the high viscosity liquid is extruded out of the cylinder. Once the wrench is released, the push tooth on the push block applies a very small force to the rod body. Said force could be overcome by matching the rod body with the gun body or providing an anti-back mechanism on the rod body which directly acts on the rod body. This way, the push tooth will flow over the teeth set on the rod body without bringing the rod body to move backwards. The spacing of the teeth set on the rod body could be made even during production, which helps to make the push block drive the rod body to move the same distance every time, so that the exportation amount of the high viscosity liquid could be kept uniform and the coating quality is improved. The tooth-shaped convex body contacts with the push tooth on the push rod in a face-to-face way during operation, resulting that the abrasion therebetween is smaller and the use life is longer.

In the extrusion apparatus of the invention, the rod body is made of a magnetic material, the permanent magnet is positioned on the push block, and the permanent magnet is away from the hinge end of the push block. Generally, the permanent magnet is set at the free end of the push block, and the rod body is formed of a magnetic material, such as iron, cobalt and nickel. This way, the push tooth on the push block is easily driven by the permanent magnet to move to the rod body.

In the extrusion apparatus of the invention, the push tooth is arranged on the permanent magnet. During operation, the permanent magnet directly contacts with the rod body, and the push block is matched with the rod body quickly.

In the extrusion apparatus of the invention, the permanent magnet is mounted at one end of the push block. When the permanent magnet is connected to the push block, a groove is generally set at the end of the push block, and a corresponding convex body is set on the permanent magnet which is closely matched with the groove. Adhesives could be used to accomplish the fixed connection of the permanent magnet and the push block instead of the groove and the convex body as mentioned.

In the extrusion apparatus of the invention, an anti-back mechanism is set between the gun body and the rod body for restricting reverse movement of the rod body, which helps to drive the rod body move in a reverse direction when the push block moves backward.

In the extrusion apparatus of the invention, the anti-back mechanism is set within the anti-back hole in the gun body which comprises a steel ball, a spring and a plug, the spring is placed between the steel ball and the plug, the steel ball is pressed against the teeth on the rod body, and the plug is threadedly connected to the gun body. The steel ball is pressed against the teeth on the rod body with aid of the spring, and the friction force generated between the steel ball and the teeth restricts movement of the rod body. Said friction force should be overcome before the rod body is driven by the push block to move forward. Once the extrusion operation is accomplished, the piston in the cylinder storing the high viscosity liquid pushes the rod body to move a certain distance reversely, so that no excessive high viscosity liquid flows out of the cylinder through the outlet, which avoids waste and makes the liquid conveniently flow out of the outlet during next operation. The plug could be turned by the friction force between the steel ball and the teeth to vary the retraction of the spring, so that the pressure applied by the steel ball on the teeth could be adjusted, and the friction force therebetween could be adjusted thereby.

In the extrusion apparatus of the invention, a stopper is provided at a position of the gun body contacting with the hinge end of the push block. When the push block is reset by the wrench, the hinge end of the push block could be supported in the stopper. The free end of the push block could be prevented departing from the rod body overly after reset by setting the position of the stopper in the gun body, so that the extrusion apparatus could be operated more conveniently in continuous work. Moreover, after the hinge end of the push block is blocked by the stopper, the distance between the push tooth on the push block and the rod body is not too large, so that one end of the push block having the push tooth could move to the rod body during next turn of the wrench.

In the extrusion apparatus of the invention, the outer end face of the hinge end of the push block is an arc-shaped face or an inclined face, the outer end face of the hinge end of the push block could contact with the gun body, and the two contact surfaces are matched with each other. When the push block is reset, the push tooth on the push block is disengaged from the teeth on the rod body under action of the arc-shaped face or the inclined face, so that no force is applied to the rod body when the push tooth is moved back and reset.

In the extrusion apparatus of the invention, stopper stiffeners are symmetrically set at the edges on both sides of the stopper in the gun body. The stopper stiffeners could enlarge the contact surface area between the stopper in the gun body and the outer end face of the hinge end of the push block, and the stopper and the outer end face of the hinge end of the push block could contact stably.

In the extrusion apparatus of the invention, the gun body and the handle are connected together as a unitary piece on which a stiffener extending along the edge is provided. The stiffener could maintain the strength of the gun body, ensure the holder feel comfortable and save the material of the gun body.

In the extrusion apparatus of the invention, a stable permanent magnet is placed between the gun body and the rod body. The stable permanent magnet applies a magnetic force to the rod body and the pressure exerted by the rod body on the gun body is increased, so that a larger friction force is generated between the rod body and the gun body when the rod body slides over the gun body. When the anti-back mechanism could not well restrict reverse movement of the rod body due to abrasion, the cylinder could be maintained within the retainer by the rod body with aid of the stable permanent magnet.

In the extrusion apparatus of the invention, a cavity is set within the gun body, the stable permanent magnet is arranged within the cavity, the size of the cavity along the length of the rod body is larger than that of the stable permanent magnet along the length of the rod body, and a press cap is fixedly connected to the gun body outside the cavity. In order to facilitate processing, the cavity has an opening facing the rod body, the stable permanent magnet directly contacts with one side of the rod body without teeth, and the stale permanent magnet could slide within the cavity as the rod body slides.

In the extrusion apparatus of the invention, a protruded spherical convex body is provided on the face of the gun body contacting with the outer end face of the hinge end of the push block. When the wrench is reset, the hinge end of the push block moves to the convex body. The push block is turned by the lifting force of the convex body, and the push tooth on the push block could be conveniently disengaged from the teeth on the rod body.

In the extrusion apparatus of the invention, a cylinder-like reset sleeve is mounted in the handle, a compression spring and a plug rod are set within the reset sleeve, one end of the plug rod extends out of the reset sleeve and is pressed against the inner side of the wrench, and the other end thereof is pressed against one end of the compression spring. The plug rod is pressed against the wrench by the compression spring, and the wrench could be reset in time after being turned to facilitate next turning of the wrench.

Therefore, the extrusion apparatus of the present invention has a simple structure which could be used stably. The exportation amount of the high viscosity liquid is more uniform and the coating quality is guaranteed by using the extrusion apparatus. When the wrench is turned, the push block hinged to the wrench could be well snapped to the teeth on the rod body under action of the magnetic force of the permanent magnet, so that driving force is provided for the rod body to slide over the gun body in a forward direction. When the rod body is driven to advance by the push bock, the push block is extended to the rod body, decreasing the force to turn the wrench. A steel ball is provided to be pressed against the rod body in the gun body. The rod body could overcome the friction force applied by the steel ball to slide reversely. In such a case, no excessive high viscosity liquid flows out of the cylinder, which avoids waste and keeps the outlet of the cylinder clean.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
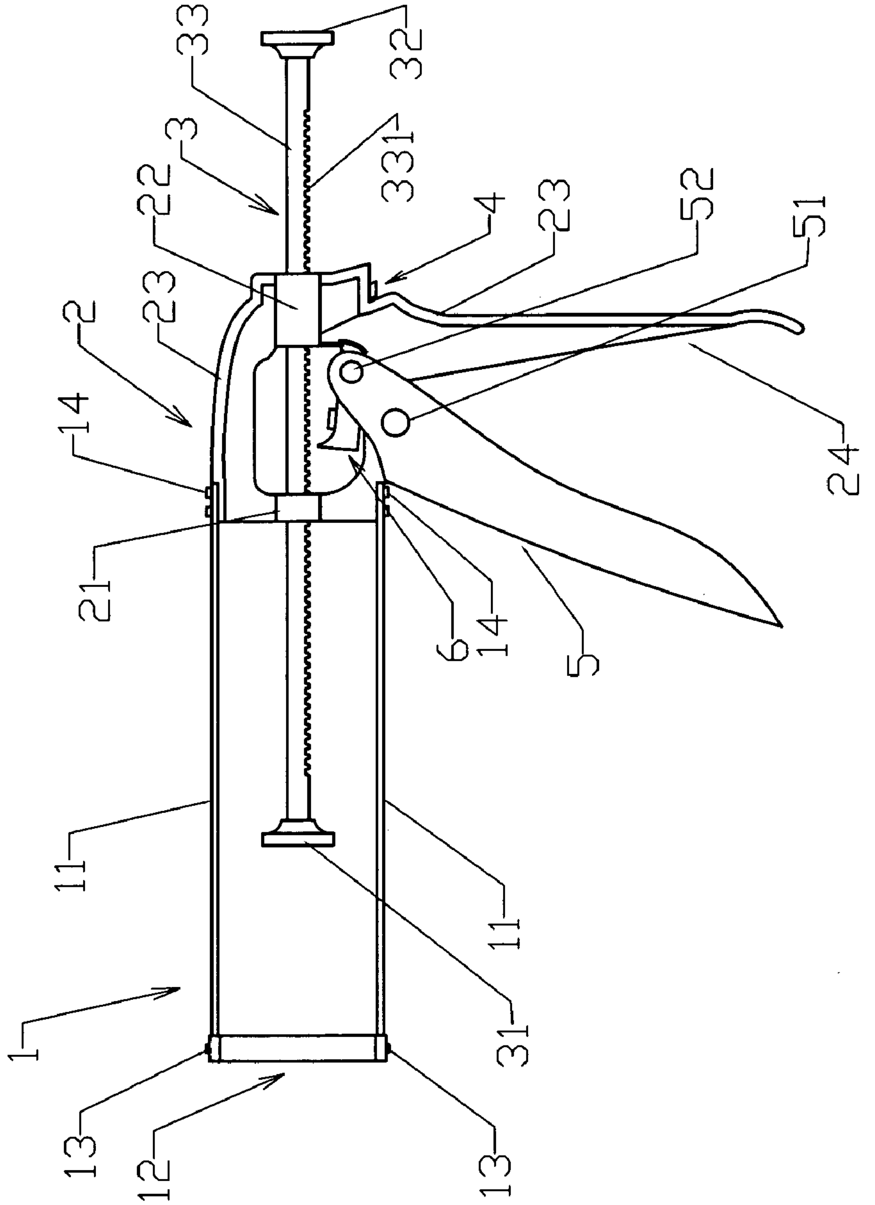
FIG. 1 is a structural schematic view showing the extrusion apparatus for high viscosity liquid of the invention.
Figure 2:
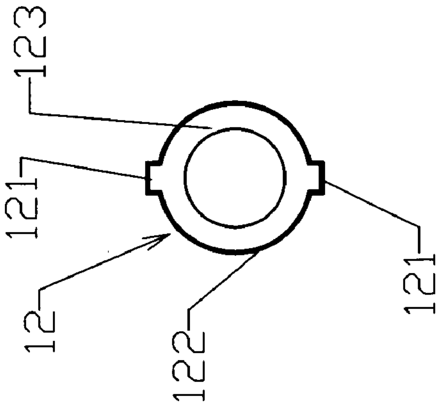
FIG. 2 is a structural schematic view showing a mount seat of the extrusion apparatus for high viscosity liquid of the invention.
Figure 3:
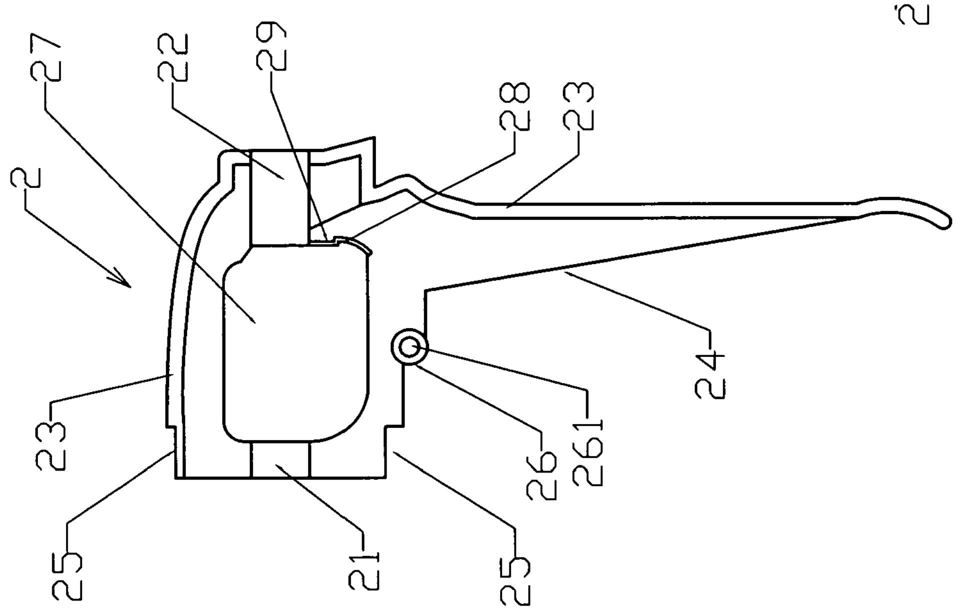
FIG. 3 is a structural schematic view showing a gun body of the extrusion apparatus for high viscosity liquid of the invention.

Referring to FIGS. 1-3, the extrusion apparatus for high viscosity liquid of the invention comprises a gun body 2, a retainer 1 fixedly connected to the gun body 2, a push rod 3 slidably running through the gun body 2, a handle 24 integrated with the gun body 2, a wrench 5 hinged to the gun body 2 and a push block 6 with one end hinged to the distal portion of the wrench 5.

Figure 9:
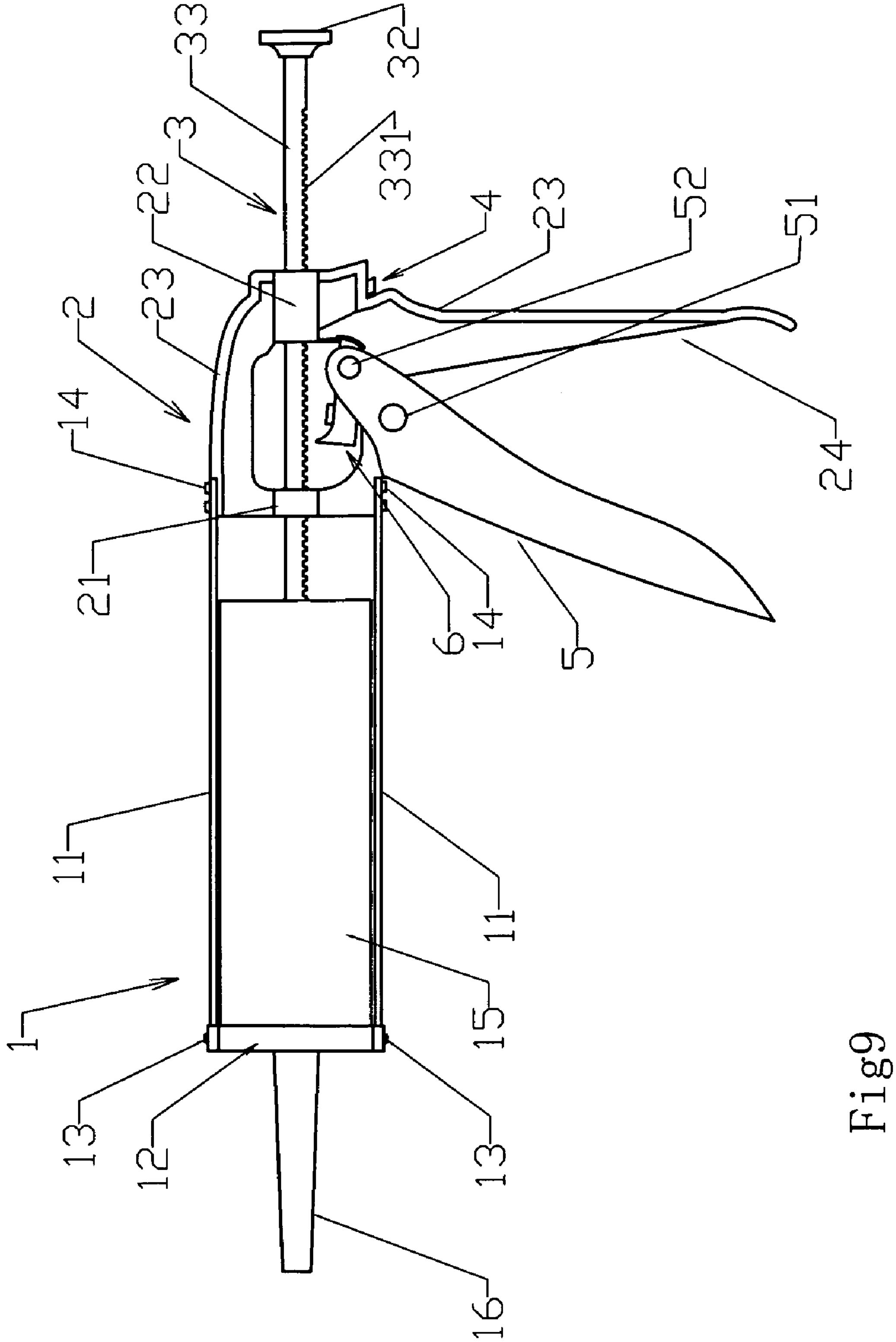
FIG. 9 is a schematic view of the extrusion apparatus for high viscosity liquid of the invention during operation.

The retainer 1 includes two sheet-shaped connection pieces 11 and a mount seat 12. The back ends of the connection pieces 11 are respectively fixedly connected to two rear coupling ports 25 through rivets 14. The mount seat 21 is one punched and formed piece, which is consisted of an annular baffle 123 and an edge 122 integrated as one piece. The edge 122 is vertical to the baffle 123. Two front coupling ports 121 are symmetrically formed on the edge 122, to which the front ends of the connection pieces 11 are respectively fixedly connected through rivets 13. With reference to FIG. 9, a cylinder 15 for storing the high viscosity liquid is provided between the connection pieces 11 in the retainer 1. An outlet pipe 16 at one end of the cylinder 15 is passed through the mount seat 12. One end of the push rod 3 extends into the other end of the cylinder 15 along the axis of the cylinder 15.

The gun body 2 is provided with a wrench hinge seat 26, through which a wrench hinge hole 261 is penetrated. The wrench 5 is hinged to the wrench hinge seat 26 via the wrench axle 51 which is interstitially passed through the wrench hinge hole 261. The wrench axle 51 could be a rivet or a blot. A torsion spring (not shown) is muff-coupled to the wrench hinge seat 26. One end of the torsion spring is lapped over the inner side of the wrench 5, and the other end is lapped over the gun body 2. The wrench 5 is generally integrally formed by iron sheet, with one end extending out of the gun body 2 and the other end extending into a push block mounting area 27 set on the gun body 2. The length of the wrench 5 extending into the push block mounting area 27 is shorter than the length of the wrench 5 positioned at the other side of the wrench axle 51.

Figure 7:
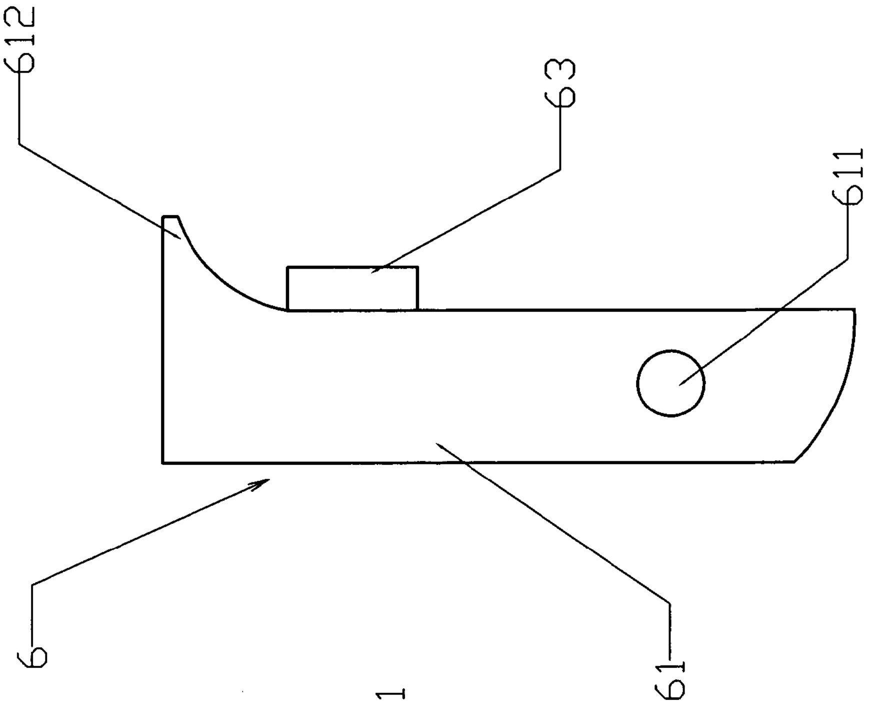
FIG. 7 is an enlarged structural schematic view of a second embodiment of the push block of the extrusion apparatus for high viscosity liquid of the invention.
Figure 6:
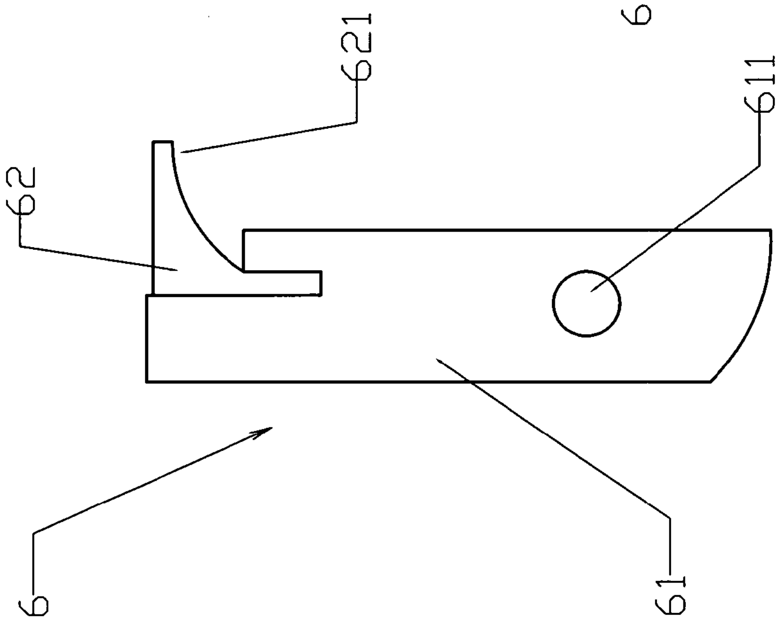
FIG. 6 is an enlarged structural schematic view of a first embodiment of the push block of the extrusion apparatus for high viscosity liquid of the invention.

The push block 6 is positioned in the push block mounting area 27. One end of the push block 6 is hinged to one end of the wrench 5 extending into the push block mounting area 27. As shown in FIGS. 6 and 7, a push block hinge hole 611 is set at the hinge end of the push block 6. The push block 6 is hinged to the wrench 5 via a push block axle 52. The push block axle 52 is interstitially passed through the push block hinge hole 661.

Figure 4:
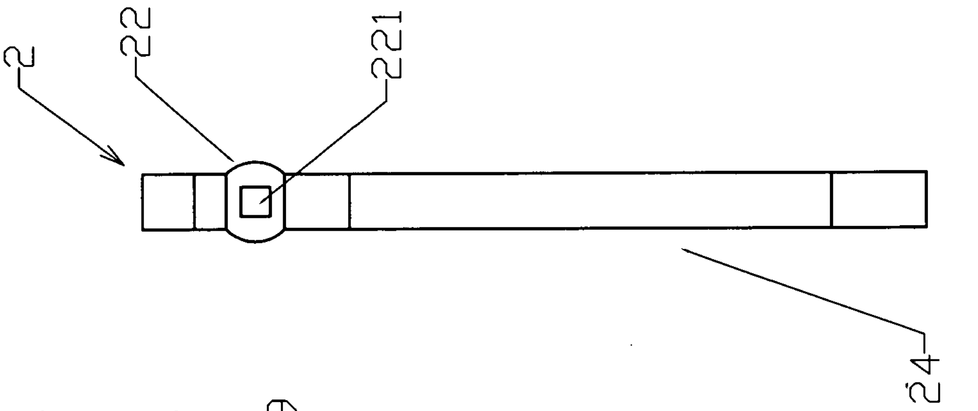
FIG. 4 is a side view showing the gun body of the extrusion apparatus for high viscosity liquid of the invention.

Referring back to FIG. 4, the push rod has a bar-shaped iron rod body 33 and a front push plate 31 and a rear push plate 32 respectively fixed on the front end and the back end of the rod body 33. A front coupling seat 21 and a rear coupling seat 22 are respectively provided at two sides of the push block mounting area 27 of the gun body 2. The rod body 33 is passed through penetrating push rod holes 221 set on the front and rear coupling seats respectively. The front push plate 31 extends into the retainer 1, and the rear push plate 32 extends out of the gun body 2. The rod body 31 lies across the push block mounting area 27. Several teeth 331 are uniformly arranged in parallel on one side of the rod body 33 facing the push block 6. A push tooth is provided on one side of the free end of the push block 6 adjacent to the rod body 33. A permanent magnet is placed between the rod body 33 and the push block 6. Generally, the permanent magnet is set on the push block 6 and away from the hinge end of the push block 6.

The outer end face of the hinge end of the push block 6 is an arc-shaped face or an inclined face. The portion of the gun body 2 which could contact with the outer end face of the hinge end of the push block 6 is also an arc-shaped face or an inclined face matched with said outer end face. A stopper 28 is provided on the side of the push block mounting area 27 on the gun body 2 corresponding to the hinge end of the push block 6. After the push block 6 is entirely reset, the stopper 28 is snapped to the outer upper side of the hinge end of the push block 6. In such a case, the push block is kept in the inclined direction, that is to say, the free end of the push block 6 is kept in the direction extending to the rod body 33. The push tooth on the push block 6 is disengaged from the teeth 331 on the rod body 33 under effect of the above two inclined or arc-shaped faces. In order to increase the contact surface area of the above two inclined or arc-shaped faces, stopper stiffeners 29 are symmetrically set at the edges on both sides of the stopper 28 in the gun body 2.

Figure 8:
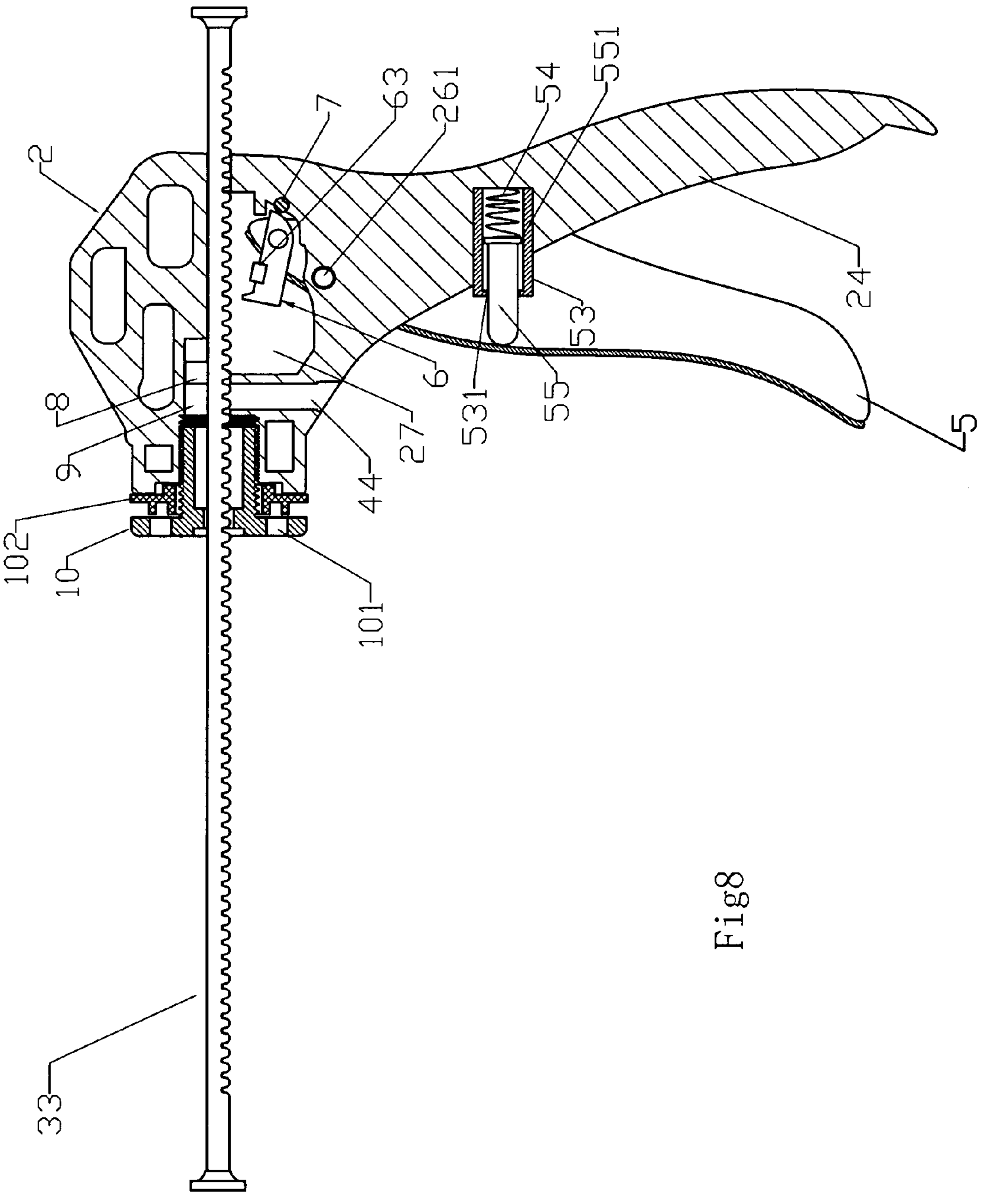
FIG. 8 is a partial sectional structural schematic view of another embodiment of the gun body of the extrusion apparatus for high viscosity liquid of the invention.

If the outer end of the hinge end of the push block 6 is an arc-shaped or inclined face and the corresponding position of the gun body 2 is also an arc-shaped or inclined face, high process precision is required for during practical production process. Furthermore, the requirement is high during assembly of the push block 6, and the production process is troublesome, with a result that the push tooth on the push block 6 could not be easily disengaged from the teeth 331 on the rod body 33. As shown in FIG. 8, a protruded spherical convex body 7 is provided on the face of the gun body 2 contacting with the hinge end of the push block 6. The convex body 7 could be formed by mounting a steel ball in the corresponding position on the gun body 2. When the push block 6 is reset following the wrench 5, the outer end face of the hinge end of the push block 6 firstly contacts with the convex body 7. The push block 6 integrally rotates with aid of the convex body 7, with the hinge end thereof turning to the direction of the rod body 33, so that the push tooth on the push block 6 is disengaged from the teeth 331 on the rod body 33.

Figure 5:
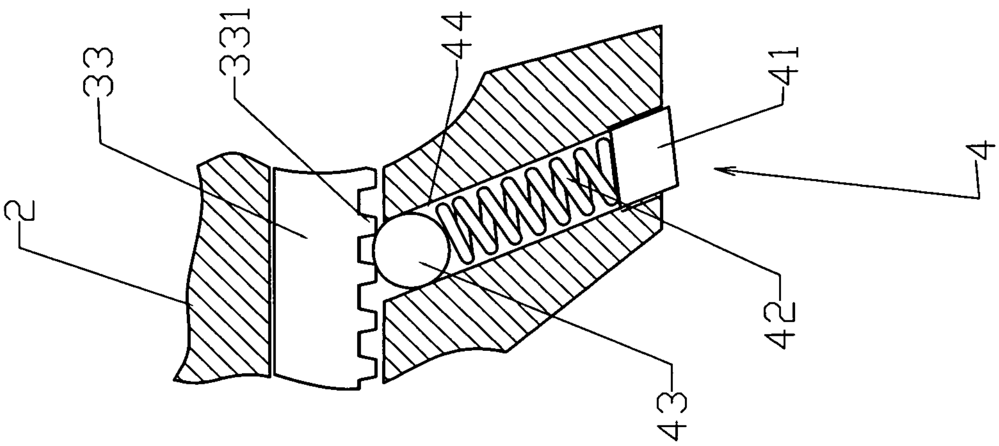
FIG. 5 is a partial sectional view showing an anti-back assembly mounted at the gun body of the extrusion apparatus for high viscosity liquid of the invention.

Referring to FIG. 5, in order to ensure the rod body 33 not to be driven to move reversely by reset of the push block 6, an anti-back hole 44 is provided at a position in the gun body 2 corresponding to the rear coupling seat 22, in which an anti-back mechanism 4 is set. The anti-back hole 44 is a penetrating hole, with one end leading to the push rod hole 221 set on the rear coupling seat 22 and the other end leading to outside of the gun body 2. The anti-back mechanism 4 is consisted of a steel ball 43, a plug 41 and a spring 42 placed between the steel ball 43 and the plug 41. The steel ball 43 is set within the anti-back hole 44 and pressed against the teeth 331 on the rod body 33 under the force of the spring 42. The plug 41 is threadedly connected to the inner wall of the anti-back hole 44. The retraction of the spring 42 could be adjusted by turning the plug 41, so that the pressure between the steel ball 43 and the teeth 331 could be adjusted. Moreover, the anti-back mechanism could be replaced by the nonmetallic sheaths in the push rod holes 221 set on the front and rear coupling seats, such as rubber sheaths or plastic sheaths. If the nonmetallic sheaths are used, the nonmetallic sheaths are closely matched with the rod body 33. However, the abrasion-resistance of the nonmetallic sheath is poor, which reduces the use life of the anti-back mechanism.

In some cases, the anti-back mechanism fails due to abrasion, and the cylinder storing high viscosity liquid is tended to be dropped out of the retainer 1. As shown in FIG. 8, in order to address the above-mentioned problem, a stable permanent magnet 8 is provided adjacent to the rod body 33 in the gun body 2, which is set in the cavity 9 of the gun body 2. The cavity 9 leads into the push rod hole 221. The size of the cavity 9 along the length of the rod body 33 is slightly larger than that of the stable permanent magnet 8 along the length of the rod body 33. When the stable permanent magnet 8 is located within the cavity 9, it could directly contact with one side of the rod body 33 without teeth 331. A press cap 10 is threadedly connected to the outer side of the stable permanent magnet 8 for restricting the slide of the stable permanent magnet 8 in the cavity 9. In order to tighten the press cap 10, tightening holes 101 numbered as four or six are arranged on the press cap 10. The convex body on the specific tool is snap fitted with the tightening holes 101, so that the press cap 10 is tightened on the gun body 2. A coupling bracket 102 is further arranged between the press cap 10 and the gun body 2. In such a case, an annular coupling ring (not shown) is provided on the end of the retainer connecting with the gun body 2, which is fixedly connected between the press cap 10 and the coupling bracket 102. At this time, the anti-back hole 44 and the cavity 9 are symmetrically positioned on both sides of the rod body 33. The anti-back mechanism 4 in the anti-back hole 44 acts on the rod body 33 together with the stable permanent magnet 8, so as to restrict the reverse slide of the rod body 33.

As shown in FIG. 8, a reset assembly is arranged at the upper portion of the center of the handle 24, which is used to take the function of the above-mentioned torsion spring to reset the wrench 5. The reset assembly includes a cylinder-like reset sleeve 53, a compression spring 54 and a plug rod 55. The reset sleeve 53 is mounted in the handle 24 in parallel with the rod body 33. Both the compression spring 54 and the plug rod 55 are set within the reset sleeve 53. The plug rod 55 extends out of the reset sleeve 53. The inner end of the plug rod 55 is pressed against one end of the compression spring 54, and the outer end thereof is pressed against the inner side of the wrench 5. In order to prevent the plug rod 55 slipping out of the reset sleeve 53, an annular capped edge 531 is arranged on the inner side of one end the reset sleeve 53 facing the wrench 5, and an annular convex body 551 is arranged on the outer side of the inner end of the plug rod 55. The capped edge 531 could block the annular convex body 551.

FIGS. 6 and 7 are structural schematic views of two embodiments of the push block 6 of the extrusion apparatus for high viscosity liquid of the invention. The push block 6 is constructed of a push block body 61 and a permanent magnet thereon. In FIG. 6, an angular permanent magnet 62 is mounted at the free end of the push block body 61. A permanent magnet push tooth 621 is set on one end of the angular permanent magnet 62 adjacent to the push rod 3. The permanent magnet push tooth 621 could be snapped at the gap between the adjacent teeth 331 on the rod body 33. In FIG. 7, the push block body 61 has a push block push tooth 612 integrated therewith at the free end. A square permanent magnet 63 is further adhered with the push block body 61. The square permanent magnet 63 is away from the hinge end of the push block 6 and close to the free end of the push block 6. According to the two structures of the push block 6 as mentioned, both the permanent magnet push tooth 621 and the push block push tooth 612 are asymmetrical. In detail, the outer side of the push tooth is a flat face normal to the push block body 61 and the inner side is an arc-shaped face which could be replaced with an inclined face. The teeth 331 on the rod body 33 have a trapezoid section as shown in FIG. 5. The side surface of the push tooth set on the push block 6 could be fully joined with the inclined side face of the teeth 331 on the rod body 33 during contact by setting the length of the push block 6, the position of the rod body 33 mounting in the gun body 2 and the inclination angle of the inclined side on the teeth 331.

The gun body 2, the front coupling seat 21, the rear coupling seat 22, the wrench hinge seat 26 and the handle 24 are connected together as a unitary piece, which is integrally casted and formed by aluminium alloy. A stiffener 23 is provided on the unitary piece to save the material used by the unitary piece, reduce the weight of the extrusion apparatus for high viscosity liquid, ensure the holder feel comfortable and facilitate the gun body 2 connecting with the retainer 1. The stiffener 23 extends along the entire outer edge of the handle 24 and the partial outer edge of the gun body 2.

During operation, the extrusion apparatus for high viscosity liquid of the invention firstly pulls the push rod 3 reversely to move the front push plate 31 and the rod body 33 of the push rod 3 backward, so that there is enough space left for mounting the cylinder for storing high viscosity liquid. When assembled in the retainer 1, the front end of the cylinder is pressed against the inner side of the baffle 123 of the mount seat 12, and the whole cylinder is placed between two connection pieces 11. When the cylinder is mounted in position, the push rod 3 is pushed and the front push plate 31 set in front of the rod body 33 is pressed against the outer side of the piston in the cylinder. When the wrench 5 is turned, the push block 6 is driven by the wrench to move forward and gets rid of control of the gun body 2. This way, the push tooth on the push block 6 moves to the rod body 33 with aid of the magnetic force, and the front end face of the push tooth is pressed against the inclined side of the teeth 331. When the wrench 5 is continued to be turned, the rod body 33 is driven by the push block 6 to move to the cylinder and pressed against the piston in the cylinder, so that the high viscosity liquid in the cylinder is extruded once. After the above extrusion, the wrench 5 is released and reset with aid of the torsion spring and the reset assembly. Under action of the inclined face or arc-shaped face set between the outer end face of the hinge end of the push block 6 and the gun body 2, particularly under action of the spherical convex body 7 on the gun body 2, the push tooth is moved away from the teeth 31 and disengaged from the teeth 331. When the stopper 28 on the gun body 2 is snapped to the push block 6, the wrench 5 and the push block 6 stops moving, and the push block 6 is stably maintained within the push block mounting area in an inclined way, so that the high viscosity liquid in the cylinder is extruded again. If the high viscosity liquid is extruded too quickly or the liquid could not completely flow over through the outlet of the cylinder in time after the operation for coating high viscosity liquid is finished, then the rod body 33 will overcome the static friction force between the teeth 331 and the steel ball 43 to slightly move reversely with aid of the high viscosity liquid and the reverse acting force of the piston in the cylinder, so that the remaining high viscosity liquid could be prevented flowing out through the outlet.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An extrusion apparatus for high viscosity liquid, said extrusion apparatus comprising a gun body (2), a retainer (1) fixedly connected to the gun body (2),
a push rod (3) slidably running through the gun body (2),
a wrench (5) hinged to the gun body (2) and
a handle (24) connected to the gun body (2),
wherein
a push block (6) is hinged to one end of the wrench (5) adjacent to the push rod (3),
an outer end face of a hinge end of the push block (6) is an arc-shaped face or an inclined face,
the outer end face of the hinge end of the push block (6) is movable to contact with the gun body, and the two contact surfaces are matched with each other,
the push rod (3) has a rod body (33) provided with several teeth (331) on a side facing the push block (6),
an anti-back mechanism (4) is set between the gun body (2) and the rod body (33) for restricting reverse movement of the rod body (33),
the anti-back mechanism (4) is set within an anti-back hole (44) in the gun body (2), said anti-back mechanism comprises a steel ball (43), a spring (42) and a plug (41),
the spring (42) is placed between the steel ball (43) and the plug (41),
the steel ball (43) is pressed against the teeth (331) on the rod body (33), and the plug (41) is threadedly connected to the gun body (2),
a push tooth is provided on the push block (6),
a permanent magnet is placed on the push block (6) or the push rod (3), and the push tooth is movable to snap to the teeth (331) under action of the magnetic force of the permanent magnet.

2. The extrusion apparatus for high viscosity liquid as claimed in claim 1, wherein the rod body (33) is made of a magnetic material, the permanent magnet is positioned on the push block (6), and the permanent magnet is away from the hinge end of the push block (6).

3. The extrusion apparatus for high viscosity liquid as claimed in claim 2, wherein the push tooth is arranged on the permanent magnet.

4. The extrusion apparatus for high viscosity liquid as claimed in claim 3, wherein the permanent magnet is mounted at one end of the push block (6).

5. The extrusion apparatus for high viscosity liquid as claimed in claim 1, wherein a stable permanent magnet (8) is placed between the gun body (2) and the rod body (33).

6. The extrusion apparatus for high viscosity liquid as claimed in claim 5, wherein a cavity (9) is set within the gun body (2), the stable permanent magnet (8) is arranged within the cavity (9), the size of the cavity (9) along the length of the rod body (33) is larger than that of the stable permanent magnet (8) along the length of the rod body (33), and a press cap (10) is fixedly connected to the gun body (2) outside the cavity (9).

7. The extrusion apparatus for high viscosity liquid as claimed in claim 1, wherein a protruded spherical convex body (7) is provided on the face of the gun body (2) contacting with the outer end face of the hinge end of the push block (6).

* * * * *